United States Patent [19]

Carpenter

[11] Patent Number: 4,642,533
[45] Date of Patent: Feb. 10, 1987

[54] CONSTANT CURRENT POWER CIRCUIT FOR HORIZONTAL DEFLECTION OF CATHODE RAY TUBE

[75] Inventor: John C. Carpenter, Reseda, Calif.

[73] Assignee: Ocean Technology, Inc., Burbank, Calif.

[21] Appl. No.: 716,814

[22] Filed: Mar. 27, 1985

[51] Int. Cl.$^4$ ............................................. H01J 29/70
[52] U.S. Cl. ........................................ 315/408; 315/403
[58] Field of Search ............... 315/408, 403, 410, 371, 315/406, 401, 402; 328/183

[56] References Cited

U.S. PATENT DOCUMENTS

| Re. 30,074 | 8/1979 | van Hattum . | |
|---|---|---|---|
| 3,257,567 | 6/1966 | Kotas | 328/183 |
| 3,324,413 | 6/1967 | Konno | 315/410 |
| 3,419,808 | 12/1968 | Lenhoff | 328/183 |
| 3,426,245 | 2/1969 | Yurasek et al. . | |
| 3,767,964 | 10/1973 | Varian . | |
| 3,947,723 | 3/1976 | Thompson | 315/408 |
| 3,965,391 | 6/1976 | Lister | 315/408 |
| 3,983,452 | 9/1976 | Bazin | 315/403 |
| 4,180,765 | 12/1979 | White . | |
| 4,188,567 | 2/1980 | Monroe . | |
| 4,191,932 | 3/1980 | Nagahama | 328/183 |
| 4,314,184 | 2/1982 | Ryan . | |
| 4,460,851 | 7/1984 | Bistline et al. | 315/408 |

Primary Examiner—Theodore M. Blum
Assistant Examiner—D. Cain
Attorney, Agent, or Firm—Harris, Kern, Wallen & Tinsley

[57] ABSTRACT

A circuit for providing input power to the horizontal deflection coil or yoke for a raster scan type of cathode ray tube. The circuit includes a closed loop current sensor which uses an operational amplifier to compare the sensed current with an adjustable reference voltage to provide a control for the current, thereby providing a constant current power source for a resonant deflection yoke flyback circuit. The current drive and S shaping capacitor are directly coupled to the deflection coil, omitting a coupling transformer and a linearity coil.

14 Claims, 3 Drawing Figures

CONSTANT CURRENT POWER CIRCUIT FOR HORIZONTAL DEFLECTION OF CATHODE RAY TUBE

BACKGROUND OF THE INVENTION

This invention relates to a power circuit for the horizontal deflection yoke of a cathode ray tube utilizing a raster scan for the display.

One purpose of the invention is to provide a stable, low cost, power efficient circuit capable of operating a horizontal deflection yoke of a cathode ray tube as used in a raster scan application, such as in television and computer monitors. The constant current power circuit may be used in other applications, such as in a television camera or other electronic pick-up device which requires horizontal deflection.

The conventional circuit normally requires a flyback transformer for optimum operation. Further, the conventional circuit also requires another transformer for base switching of the flyback transistor. The flyback deflection and base transformers contribute substantially to the cost, size and weight of the conventional circuitry. Also, losses in these components adversely affect the efficiency of this circuitry. Further, the input power to the conventional circuit is obtained from the power source in a transient manner as opposed to the constant current power circuit of the present invention. The advantages of the present invention in this regard are: one, the elimination of transient loads on the dc power source thus allowing optimum design of the power source; and, two, the prevention of voltage variations and transients on the dc power source from creating undesirable spurious modulation of the horizontal deflection.

It is an object of the present invention to provide a new and improved power circuit for the horizontal deflection yoke of a cathode ray tube which eliminates the two transformers, and for some applications the linearity coil.

The conventional horizontal deflection yoke control circuit includes a switching transistor shunted by a flyback capacitor for providing frequency control of the horizontal oscillations in the yoke flyback circuit, and resetting at the proper time to create the sawtooth current waveform in the yoke. It is the sawtooth current waveform which provides the desired horizontal raster scan which is utilized in cathode ray tube devices, such as television receivers.

The amplitude of the horizontal oscillations in the conventional circuit is directly proportional to the level of the dc voltage supplied from a regulator transistor, and this amplitude is directly related to the width of the raster display. Hence, the width of the display is a function of the dc input voltage.

The standard procedure for providing the input power is through a constant voltage dc source, typically utilizing a transformer and a linearity coil. Correction for the pin cushion effect in the conventional circuit requires voltage modulation of the constant voltage dc power source.

It is an object of the present invention to provide a new and improved supply circuit incorporating a constant current dc power input rather than a constant dc voltage input, and eliminating the transformers and coils. A further object is to provide for temperature compensation of the constant current power input in order to reduce environmental effects, and to allow pin cushion correction by current modulation of the constant current power input.

It is another object of the invention to provide a dc coupled control circuit for the base of the the flyback switching transistor, thereby eliminating coupling transformers and permitting the switching transistor base return circuit to float on a variety of potentials, which reference potentials are negative with respect to the voltage source providing the constant current power. The reference potentials include ground.

It is a particular object of the invention to provide a new and improved supply circuit utilizing a constant current dc power source directly connected to the horizontal deflection yoke and a flyback circuit directly connected to the horizontal deflection yoke.

Other objects, advantages, features and results will more fully appear in the course of the following description.

SUMMARY OF THE INVENTION

A control circuit for operating a horizontal deflection yoke of a cathode ray tube from a power source and including a flyback control circuit having a horizontal sweep synchronizing signal as an input, and a constant current control circuit as an input. The constant current control circuit includes a current sensing and control circuit, and a constant current power source and S shaping capacitor circuit. The S shaping capacitor is connected between a yoke terminal and circuit ground. The flyback control circuit is directly connected between another yoke terminal and circuit ground. The S shaping capacitor and flyback control circuit in combination with the yoke operate in a resonant mode.

In the preferred embodiment, the constant current control circuit includes a power transistor connected in series with a current sensing resistor to provide an input to an operational amplifier, with the output of the operational amplifier connected to the power transistor base for controlling current to the deflection yoke and S shaping capacitor. The flyback control circuit preferably includes another power transistor connected between the yoke and circuit ground with the flyback capacitor and flyback diode connected across the second transistor.

In the preferred embodiment, a side pin cushion compensation unit is connected between an integrated vertical sawtooth input and the operational amplifier for modification of the constant current. Also, the horizontal sweep synchronizing signal preferably is connected to the flyback control circuit transistor base with a capacitor coupled start up circuit for delaying the base square wave signal to the flyback control circuit transistor to prevent start up problems. This signal is directly coupled to the flyback control circuit power transistor by means of emitter followers, rather than by a transformer.

DESCRIPTION OF THE PREFERRED EMBODIMENT

Figure 1:
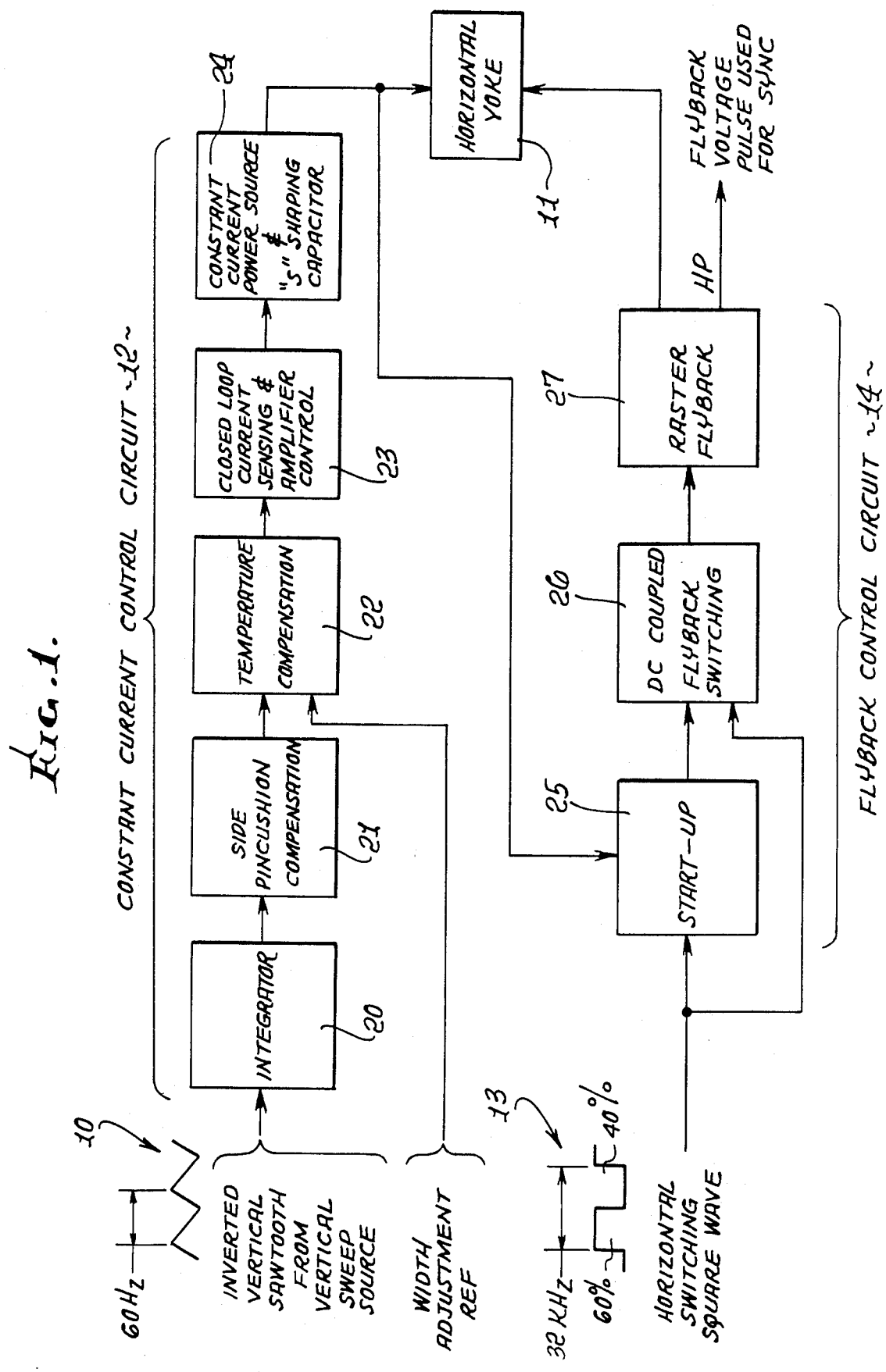
FIG. 1 is a block diagram of a constant current power circuit for the horizontal deflection yoke of a cathode ray tube and incorporating the presently preferred embodiment of the invention.
Figure 2:
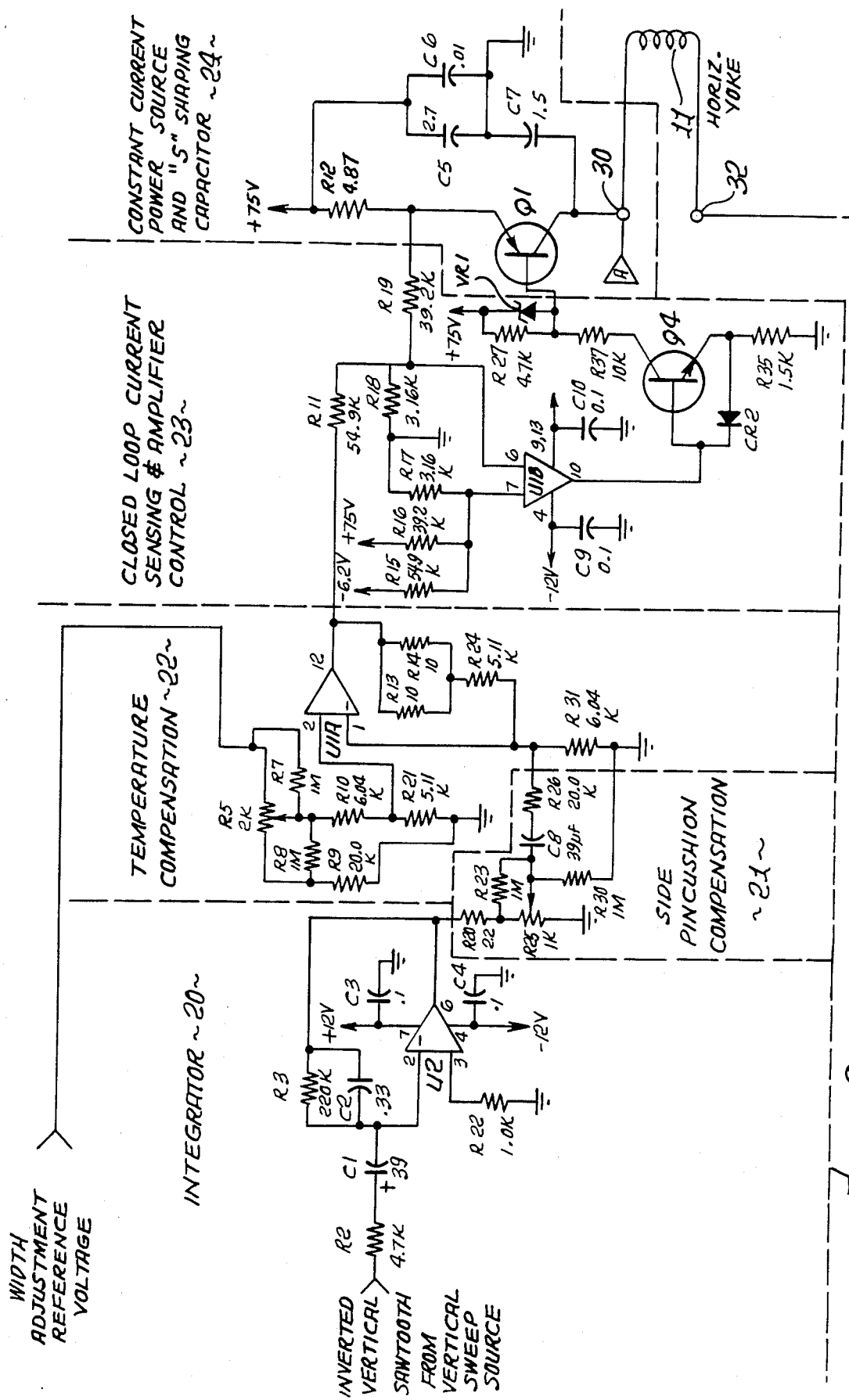
FIGS. 2 and 3 are a detailed circuit diagram of the circuit of FIG. 1.
Figure 3:
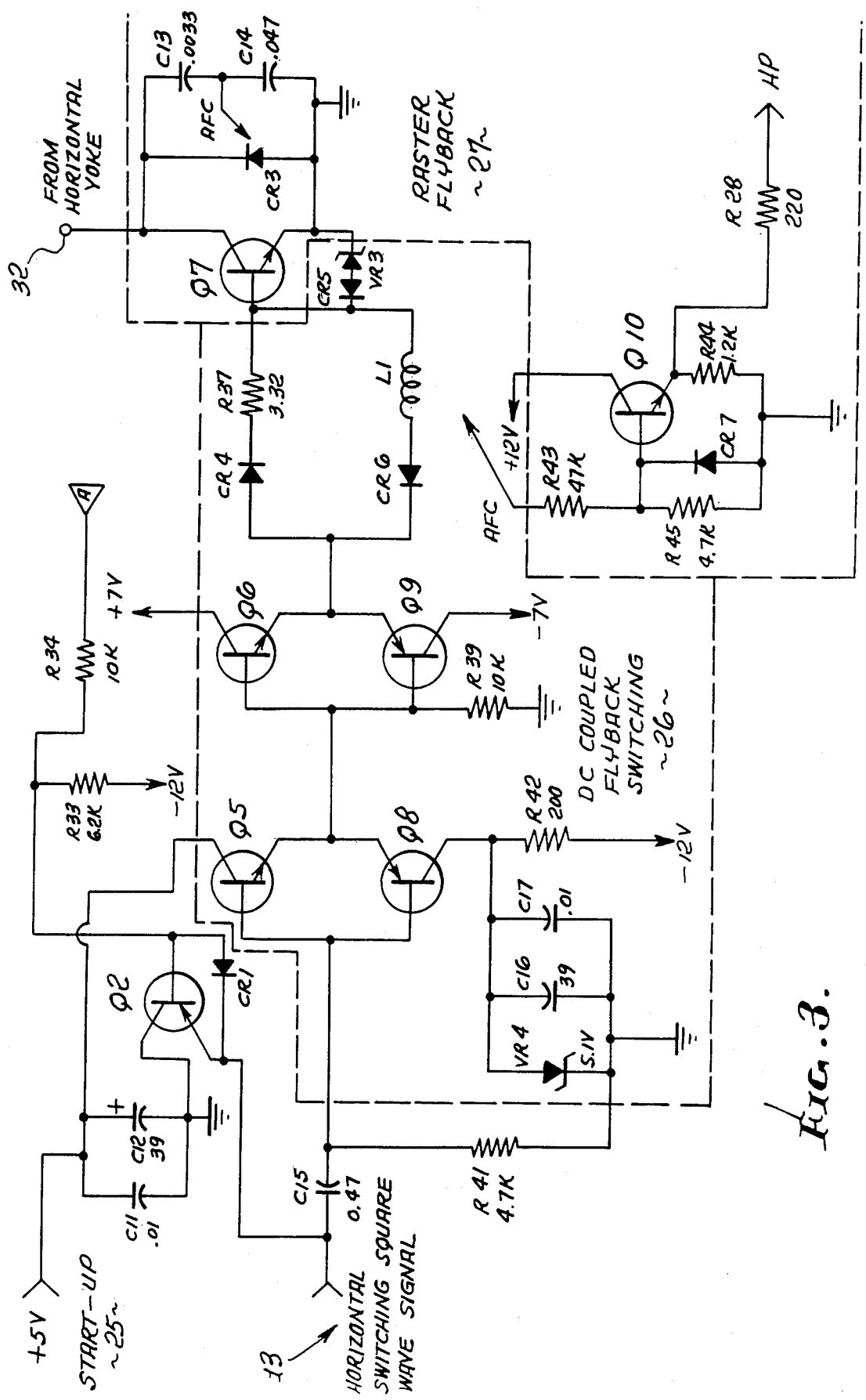

In the circuit of FIGS. 1-3, a standard input vertical sawtooth signal is integrated to produce a vertical parabolic signal which is applied as modulation to a constant current control circuit to provide side pin cushion correction to the raster scan generated in the resonant flyback circuit.

After capacity coupling, in order to isolate the circuit from external DC levels, a standard horizontal switching square wave signal is direct coupled to the base of a flyback transistor to eliminate another transformer. A start-up circuit is included to slow the full application of the switching signal to allow build up of the energy in the S shaping capacitor.

Referring to the block diagram of FIG. 1, the vertical sawtooth signal 10 from the vertical sweep source is connected to the horizontal yoke 11 by a constant current control circuit 12. The horizontal sweep for the CRT yoke is synchronized by a horizontal drive square wave 13 connected to the yoke 11 by a flyback control circuit 14. Typically the vertical sawtooth operates at 60 hertz and the horizontal square wave at 32 kilohertz, with a 60%-40% duty cycle, to produce a 1024 line by 1280 pixel 30/60 Hz interlaced display.

In the preferred embodiment, the constant current control circuit 12 includes a side pin cushion compensation unit 21, a temperature compensation unit 22, a closed loop current sensing and amplifier control unit 23, and a constant current power source and S shaping capacitor unit 24. In the preferred embodiment, the flyback control circuit 14 includes a start up unit 25, a dc coupled flyback switching unit 26, and a raster flyback unit 27. The synchronizing square wave 13 is also connected to the flyback switching unit 26. The raster flyback unit 27 provides a flyback voltage pulse HP as an output, which pulse is used for automatic frequency control synchronizing purposes and horizontal flyback raster blanking.

The sawtooth signal 10 is modified by an integrator unit 20 which produces a parabolic waveform at the vertical sweep rate. This parabolic signal from the integrator unit 20 is amplitude modified by the side pin cushion compensation unit 21, and the output of the pin cushion compensation unit 21 is summed with a width adjustment reference signal in the temperature compensation unit 22 to produce a current control signal for the amplifier control unit 23.

A specific embodiment of the circuit of FIG. 1 is shown in FIGS. 2 and 3, and identification of certain of the components is set out in Table I at the end of the specification.

In the constant current power source and S shaping capacitor unit 24, the transistor Q1 is connected with its emitter and collector in series with resistor R12 between a +75 volts supply and terminal 30 of the yoke 11. The S shaping capacitor C7 is connected between the terminal 30 and circuit ground or circuit return, and capacitors C5 and C6 are connected between the positive voltage supply and circuit ground to provide noise by-pass. A linearity coil, when required, may be connected in series with terminal 30 and yoke 11.

In the closed loop current sensing and amplifier control unit 23, an operational amplifier U1B has reference voltages connected at input terminal 7, and a current signal connected at input terminal 6, with the amplifier output at terminal 10 connected to the base electrode of transistor Q4. The junction point of resistors R27 and R32 is connected to the base electrode of Q1, and R32 is also connected to the collector of Q4. The junction point of the resistor R12 and the emitter of transistor Q1 is connected through the resistor R19 to the input terminal 6 of the operational amplifier U1B. This provides an input to the operational amplifier which varies as the dc supply current to provide a feedback control for the current control transistor Q1 to maintain a constant or substantially constant current power for the yoke 11 and raster flyback unit 27.

The inverted vertical sawtooth signal 10, after being integrated by the R2/C2/U2 combination to form a parabolic waveform at U2 output terminal 6, is also connected to the input terminal 6 of amplifier U1B through a potentiometer R25 and amplifier U1A. The amplifier U2 and associated circuitry provide for side pin cushion correction. The amplifier U1A functions as an operational amplifier with the corrected parabolic signal at input terminal 1 and with a reference voltage at input terminal 2. The magnitude of the reference voltage is controlled by potentiometer R5 thereby providing for width adjustment of the raster. The magnitude of the signal at output terminal 12 of U1A is also controlled by resistors R13 and R14, the resistance of which varies with the ambient temperature.

In the raster flyback unit 27, transistor Q7 is connected between terminal 32 of the yoke 11 and circuit ground, with series capacitors C13 and C14 functioning as the flyback resonating capacitor. The diode CR3 is connected across the transistor Q7 for the purpose of conducting the resonant horizontal sawtooth current through the yoke after flyback when Q7 is turned off by the horizontal square wave used to switch Q7 on and off at the horizontal rate. The junction point of the capacitors C13, C14 is connected to the base electrode of transistor Q10 to provide the output HP.

The horizontal switching square wave is connected through the pair of saturating switching transistors Q5 and Q8 and the pair of transistors Q6 and Q9 operated as linear emitter followers. The ouput of the pair of Q6, Q9 provides a turn on signal to the base electrode of transistor Q7 through diode CR4 and resistor R37. A turn off signal is provided through diode CR6 and inductance L1. The transistor Q7 is shut off or switched to the non-conducting state for the retrace time, and this provides a high amplitude one-half sinewave voltage whose width typically is in the order of 3 microseconds, which serves as the flyback pulse. The inductance L1 is used to slow down the transistor turn off in order to reduce the power dissipation in Q7. The dc coupled flyback circuit is used to synchronize the horizontal sweep with the incoming video signal in a total system implementation.

In the start up unit 25, the base electrode of transistor Q2 is controlled by the voltage at yoke terminal 30, with the transistor preventing application of the horizontal switching square wave to the base electrodes of the transistor pair Q5, Q8 until the collector circuit potential at terminal 30 has reached a high enough potential (energy storage in C7) to sustain the resonant flyback operation.

In operation, the S shaping capacitor C7 and the flyback capacitors C13, C14 in combination with the yoke 11 when operated under the substantially constant current power condition, function in a resonant mode. The operation of the horizontal flyback circuit is described in the following sequence.

1. The square wave signal at the base of flyback transistor Q7 goes negative and shuts off current flow from collector to emitter in Q7.

2. Current flow reverse in the yoke 11 at the base turn off; e.g., from − peak (4a) to + peak (4a) flyback occurs on the display from right to left at a very fast rate. The high voltage pulse is approximately 1KV amplitude with base pulse width equal to the flyback time of approximately 3.2 microseconds. This flyback energy is stored and released from the flyback capacitors C13,C14.

3. At the end of the flyback time, the yoke 11 reverses polarity and tries to go negative at the terminal 32 connected to the flyback transistor Q7 and cathode of the flyback diode CR3.

4. The flyback diode CR3 conducts and establishes terminal 32 at a small negative potential and positive current flow starts in the yoke 11 which is equivalent to the start of sweep at the left edge of the CRT display. The current continues to decrease in a linear manner and the CRT illuminated spot moves from the left edge to the center of the CRT.

5. Shortly before the center is reached by the illuminated spot and before the yoke 11 current becomes zero, the base of the flyback transistor Q7 is turned on by the square wave signal at that point.

6. When the current reaches zero flow, the yoke 11 connection to the collector circuit terminal 32 tries to reverse in polarity from negative to positive. The flyback diode CR3 stops conducting and the flyback transistor Q7 starts conducting in a saturated mode.

7. The yoke 11 current starts to build up as the sweep continues from the center of the CRT to the right edge of the scan.

8. When the Q7 base signal square wave reverses, flyback again occurs and the cycle is repeated.

9. An S shaping capacitor C7 is included in the flyback circuit to provide a return path for the resonant circulating current and to S shape the current wave form of the circulating sawtooth current to improve the linearity of the horizontal raster display.

10. Power for this standard flyback operation is furnished by the constant current generator in the circuit of the present invention.

As is seen from the circuit of FIGS. 2 and 3, the constant current power for the yoke 11 and raster flyback unit 27 between the dc voltage source and circuit ground is directly connected to the yoke, and the base control for the transistor Q7 is directly connected to the transistor base electrode. As used herein, the term directly connected means a direct current connection, rather than an electromagnetic connection as is achieved with transformers.

The constant current power for the raster flyback unit 27 and the associated S shaping capacitor C7 is accomplished through the collector of the power transistor Q1 by means of the feedback loop which uses the emitter of the power transistor Q1 as the negative feedback point of the current signal developed across the emitter resistor R12. Power supply ripple rejection is accomplished by referencing the noninverting circuit terminal 7 of amplifier U1B of the high open loop gain feedback circuit to the power supply which provides the drive current.

Over current protection is provided by the Zener diode VR1 connected between the base electrode of the current source transistor Q1 and the supply power of +75 volts. The width adjustment signal, the side pincushion signal and the temperature compensation signal are summed in U1A and applied to input terminal 6 of amplifier U1B in the feedback circuit.

The improved efficiency of the drive circuit resulting from the omission of the transformers and the linearity inductance allows shorter flyback times. Display centering is accomplished in external horizontal sync circuits by means of a variable time delay of the horizontal drive signal with respect to the video signal. As previously stated flyback time is approximately 3.2 microseconds at the waveform base line for the circuit illustrated.

An important side effect of the use of the constant current power circuit which incorporates active elements Q1, Q4 and U1, is that failure of a single component does not cause additional components to be overstressed and thus induce secondary failure. By way of example, a sawtooth current of 8 amperes peak-to-peak can be produced by a constant current of 235 milliamperes in the circuit disclosed. The voltage source for the constant current power input circuit will have a minimum of 2 volts in excess of the voltage loss experienced by the 8 amperes peak-to-peak sawtooth circulating current and the oscillatory control circuit. The source power supply is not required to directly supply the 8 amperes peak-to-peak sawtooth current.

The constant current control circuit functions to fix the dc power to the yoke 11 at the desired level to produce the proper sawtooth current amplitude which is proportional to the raster width. An increase in the dc current causes a increase in the raster width. Width control of the raster is provided by the adjustable voltage signal input to terminal 6 of the operational amplifier U1B through the R11/R18 voltage divider. Potentiometer R5 in conjunction with the width adjustment reference voltage provides the width adjustment signal to terminal 2 of amplifier U1A. The side pincushion correction unit provides a pincushion correction signal to terminal 1 of amplifier U1A through adjustment potentiometer R25 which operates on the parabolic signal derived from the input vertical sawtooth.

TABLE I

| U1 | LM747 | Q1 | 2N6318 |
|---|---|---|---|
| U2 | LM741 | Q2 | 2N2907A |
| CR1 | IN3611 | Q4 | 2N3440 |
| CR2 | IN3611 | Q5 | 2N2222A |
| CR3 | IN4459 | Q6 | 2N6316 |
| CR4 | IN5416 | Q7 | MJ12005 |
| CR5 | IN5416 | Q8 | 2N2907A |
| CR6 | IN5416 | Q9 | 2N6318 |
| CR7 | IN3611 | Q10 | 2N2222A |
| L1 | 22 microhenries | VR1 | IN4618 |
| | | VR3 | IN3824A |
| | | VR4 | IN5523B |

All resistances in ohms, unless otherwise stated.
All capacitors in microfarads, unless otherwise stated.

I claim:

1. In a control circuit for the horizontal magnetic deflection yoke of a cathode ray tube, the combination of:
   first and second terminals for connection to said yoke;
   a first transistor having emitter, collector and base electrodes;
   a current sensing resistor connected in a series circuit with said first transistor emitter and collector electrodes at a first junction point, with one end of said series circuit connected to a DC power source and with the other end directly connected to said yoke first terminal;

a S shaping capacitor connected between said yoke first terminal and circuit ground;

an operational amplifier having first and second inputs and an output, with said output connected to said first transistor base electrode in controlling relation and with a reference voltage connected to said first input;

first circuit means for connecting said first junction point to said operational amplifier second input;

second circuit means for connecting a current control signal to said operational amplifier second input;

a second transistor having emitter, collector and base electrodes, with said emitter and collector electrodes directly connected between said yoke second terminal and circuit ground;

a flyback capacitor connected across said second transistor emitter and collector electrodes;

a diode connected across said second transistor emitter and collector electrodes for providing a conduction path during the first half of the sweep sawtooth current waveform;

a third transistor connected as an amplifier between said operational amplifier output and said first transistor base electrode; and third circuit means for connecting a horizontal switching signal to said second transistor base electrode in controlling relation.

2. A control circuit as defined in claim 1 wherein said second circuit means includes a second operational amplifier having first and second inputs, and having an output for connection to said first operational amplifier, and including first means for connecting a modified vertical sweep signal to one of said inputs and second means for connecting a reference voltage to the other of said inputs, with one of said first and second means including at least one resistor the resistance of which varies with temperature.

3. A control circuit as defined in claim 2, wherein said second means includes a variable voltage control for adjusting the magnitude of said reference voltage to provide width adjustment.

4. A control circuit as defined in claim 3, wherein said first means includes a raster side pin cushion correction circuit having a feedback amplifier with an inverted vertical sweep signal connected as an input, and having an integrated vertical sweep in the form of a vertical parabola output connected to said second operational amplifier.

5. A control circuit as defined in claim 4 wherein said third circuit means includes a direct coupled control circuit between the horizontal switching square wave signal and said second transistor, said direct coupled control circuit including a first pair of transistors connected as saturated switchers and a second pair of transistors connected as emitter followers, with the horizontal switching square wave signal connected to said first pair as an input, the output of said first pair connected to said second pair as an input, and the output of said second pair connected to said second transistor base electrode by a bidirectional turn-on, turn-off circuit having parallel paths with a unidirectional control element in each path providing for current flow in one direction in one path and for current flow in the opposite direction in the other path.

6. A control circuit as defined in claim 5 including a start up circuit having a third transistor with emitter, collector and base electrodes, with said emitter and collector electrodes connected between said first saturated switcher input and circuit ground and with said base electrode connected to said yoke first terminal.

7. A control circuit as defined in claim 1 wherein said third circuit means includes a direct coupled control circuit between the horizontal switching square wave signal and said second transistor, said direct coupled control circuit including a first pair of transistors connected as emitter followers and a second pair of transistors connected as emitter followers, with the horizontal switching square wave signal connected to said first pair as an input, the output of said first pair connected to said second pair as an input, and the output of said second pair connected to said second transistor base electrode by a bidirectional turn-on, turn-off circuit having parallel paths with a unidirectional control element in each path providing for current flow in one direction in one path and for current flow in the opposite direction in the other path.

8. A control circuit as defined in claim 7 including a start up circuit having a third transistor with emitter, collector and base electrodes, with said emitter and collector electrodes connected between said first emitter follower input and circuit ground and with said base electrode connected to said yoke first terminal.

9. A control circuit as defined in claim 8 including a fourth transistor having emitter, collector and base electrodes with said emitter and collector electrodes connected in series with another resistor between a voltage source and circuit ground, and with said base electrode connected to said flyback capacitor, providing a flyback pulse signal.

10. In a control circuit for operating a horizontal magnetic deflection yoke of a cathode ray tube from a dc power source having first and second power terminals, the combination of:

first and second yoke terminals for connection to said yoke;

a flyback circuit having a horizontal switching square wave signal as an input;

a constant current circuit having a variable voltage reference signal as an input; and a S shaping capacitor;

said constant current circuit including a first transistor for controlling current, a current sensor for providing a current signal varying with the current in said first transistor, a first operational amplifier having said current signal and a modified vertical sweep signal as inputs and providing an output for controlling said first transistor, and a third transistor connected as an amplifier between said operational amplifier output and said first transistor base electrode to provide a substantially constant current from the power source, with said constant current circuit directly connected between said first power terminal and said first yoke terminal, with said flyback circuit directly connected between said second yoke terminal and said second power terminal, and with said S shaping capacitor connected between said first yoke terminal and said second power terminal, so that said S shaping capacitor and said control circuit when connected to the yoke and provided with substantially constant current from said constant current circuit operate in a resonant mode.

11. A control circuit as defined in claim 10 wherein said flyback circuit includes a second transistor for switching current in the yoke on and off in response to the horizontal switching square wave signal, a flyback capacitor and a diode connected in parallel with said second transistor, and a base circuit directly connected to said second transistor in controlling relation with the horizontal switching square wave signal coupled as an input to said base circuit.

12. A control circuit as defined in claim 11 wherein said base circuit comprises first and second pairs of transistors connected in cascade, with said first pair operating in a saturated switching mode and said second pair operating as linear emitter followers.

13. A control circuit as defined in claim 10 wherein said flyback circuit includes a second transistor for switching current in the yoke on and off in response to the horizontal switching square wave signal, a flyback capacitor and a diode connected in parallel with said second transistor, and a base circuit directly connected to said second transistor in controlling relation with the horizontal switching square wave signal coupled as an input to said base circuit.

14. A control circuit as defined in claim 13 wherein said base circuit comprises first and second pairs of transistors connected in cascade, with said first pair operating in a saturated mode as signal switchers and said second pair operating as linear emitter followers.

* * * * *